United States Patent

McDaniel

[15] 3,701,888
[45] Oct. 31, 1972

[54] TIME SHARED POSITION FEEDBACK SYSTEM FOR NUMERICAL CONTROL

[72] Inventor: George H. McDaniel, Northville, Mich.

[73] Assignee: The Bendix Corporation

[22] Filed: Aug. 5, 1970

[21] Appl. No.: 62,236

[52] U.S. Cl. ..........235/150.1, 235/151.11, 318/569, 318/570, 318/574
[51] Int. Cl. ..........................G06f 15/46, G05b 19/30
[58] Field of Search .235/151.11; 318/569, 570, 574, 318/150.1

[56] References Cited

UNITED STATES PATENTS 3,165,680   1/1965   Morrison ..............318/569 X

Primary Examiner—Malcolm A. Morrison
Assistant Examiner—R. Stephen Dildine, Jr.
Attorney—William F. Thornton, McGlynn, Reising, Milton & Ethington and Plante, Hartz, Smith and Thompson

[57] ABSTRACT

A numerical control system for machines having a plurality of movable elements wherein position feedback signals are generated by transforming a phase shift into a digital count indicating absolute position in either a positive or negative scale range. The respective feedback signals are time multiplexed to reduce hardware.

11 Claims, 11 Drawing Figures

INVENTOR.
George H. McDaniel
BY
Bernard, McGlynn & Reising
ATTORNEYS

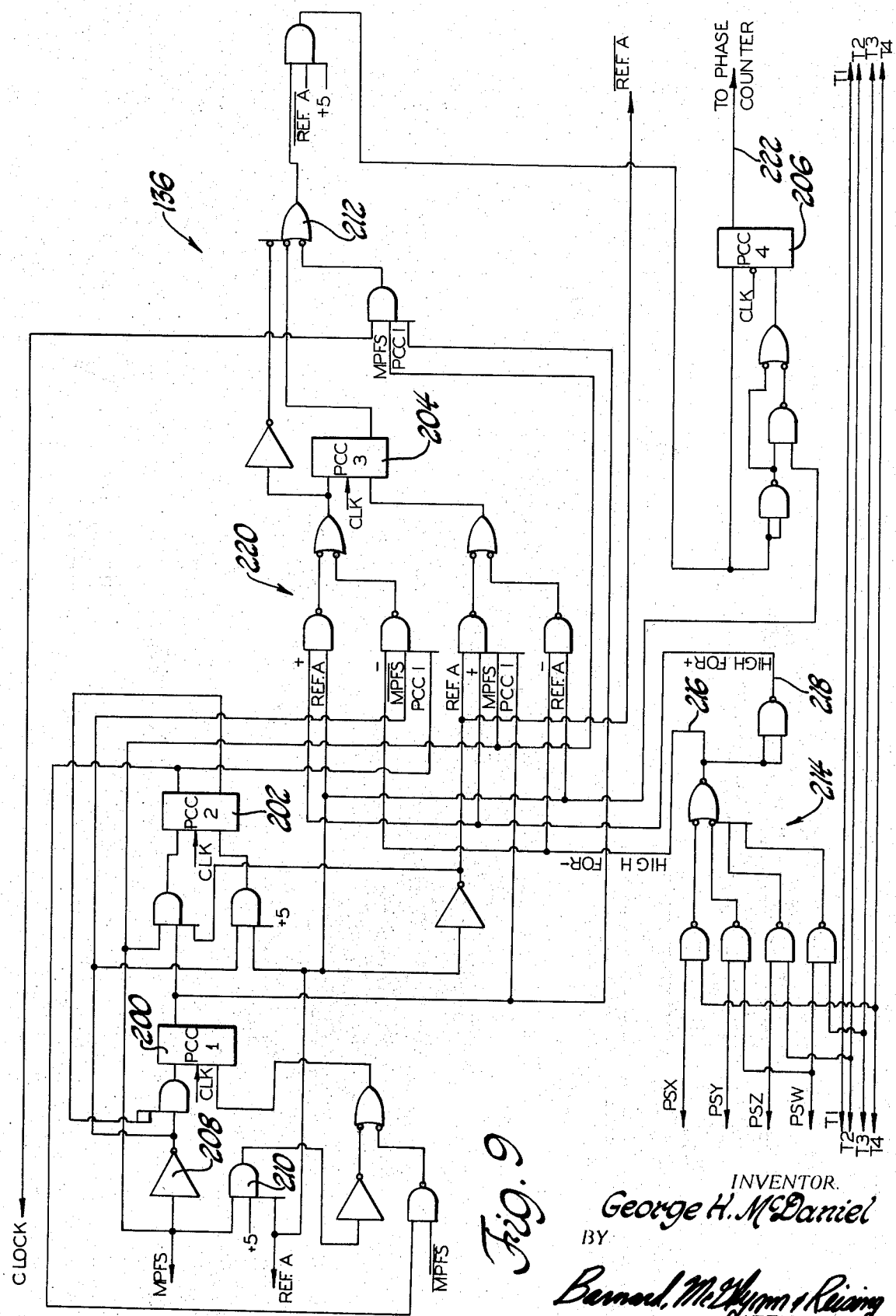

INVENTOR.
George H. McDaniel

TIME SHARED POSITION FEEDBACK SYSTEM FOR NUMERICAL CONTROL

This invention relates to numerical control systems for machines having controllably movable elements and particularly to the preparation and use of position feedback signals in such systems.

In a numerical control system for milling machines, boring machines, lathes, drafting machines, plotters or the like, control signals are generated to direct the devices which determine the position of the movable element or elements along each of several control axes. These signals are typically derived from data on tape or from command signals which are manually "dialed in" by way of a control panel together with position feedback signals and any offsets which which may be desired. It is typical to employ a separate arithmetic unit to derive the control signals for each of the plurality of controlled axes. Thus, for a multiaxial machine, a plurality of units are required. It is also typical in many control system, to provide only one range of movement from a zero position; that is, the zero position is generally at the end of scale rather than mid-scale so that only the positive position range is available. This typically complicates the performance of symmetrical element movement patterns.

In accordance with the present invention, position feedback signals from the various controlled axes are applied in a time-divided sequence to a single arithmetic unit along with position command signals to derive the control signals in a time multiplexed fashion. Thus, for a four-axis machine a savings of three arithmetic units is realized. In general, this is accomplished by the use of position feedback transducers which produce variable phase signals and the application of these variable phase signals to a feedback multiplexer unit which presents the multiplexed position feedback signals in a time-divided sequence to a phase measuring device. From the phase measuring device the position feedback signals may be combined with position command signals and offset signals, if any, derive error signals which are applied to the positioning devices.

According to another feature of the invention, position feedback signals of a digital character are derived from variable-phase waveforms to provide new position information to a position storage facility. Moreover, an absolute position indication is derived from feedback position signals which vary in phase through at least several complete cycles over the range of total displacement of the controlled element and in both negative and positive ranges around an arbitrarily selected zero reference position. In general this is accomplished by transforming the phase information in the feedback signal to a digital count of, for example, three lesser significant digits, comparing the digital count to a previously stored position quantity to determine the next most significant digit and monitoring at least that next most significant digit to determine sign information which is contained in the count expression.

Other features of the invention including a novel pulse count control circuit, a novel carry-borrow control circuit and a novel overall implementation of a control system are set forth in the following specification which describes a preferred embodiment of the invention, and is to be taken with the accompanying drawings, of which:

FIGS. 9 and 9a are a detailed schematic diagram and a waveform diagram of a portion of the feedback counter; and, FIG. 10 is a detailed schematic diagram of another portion of the feedback counter.

Figure 1:
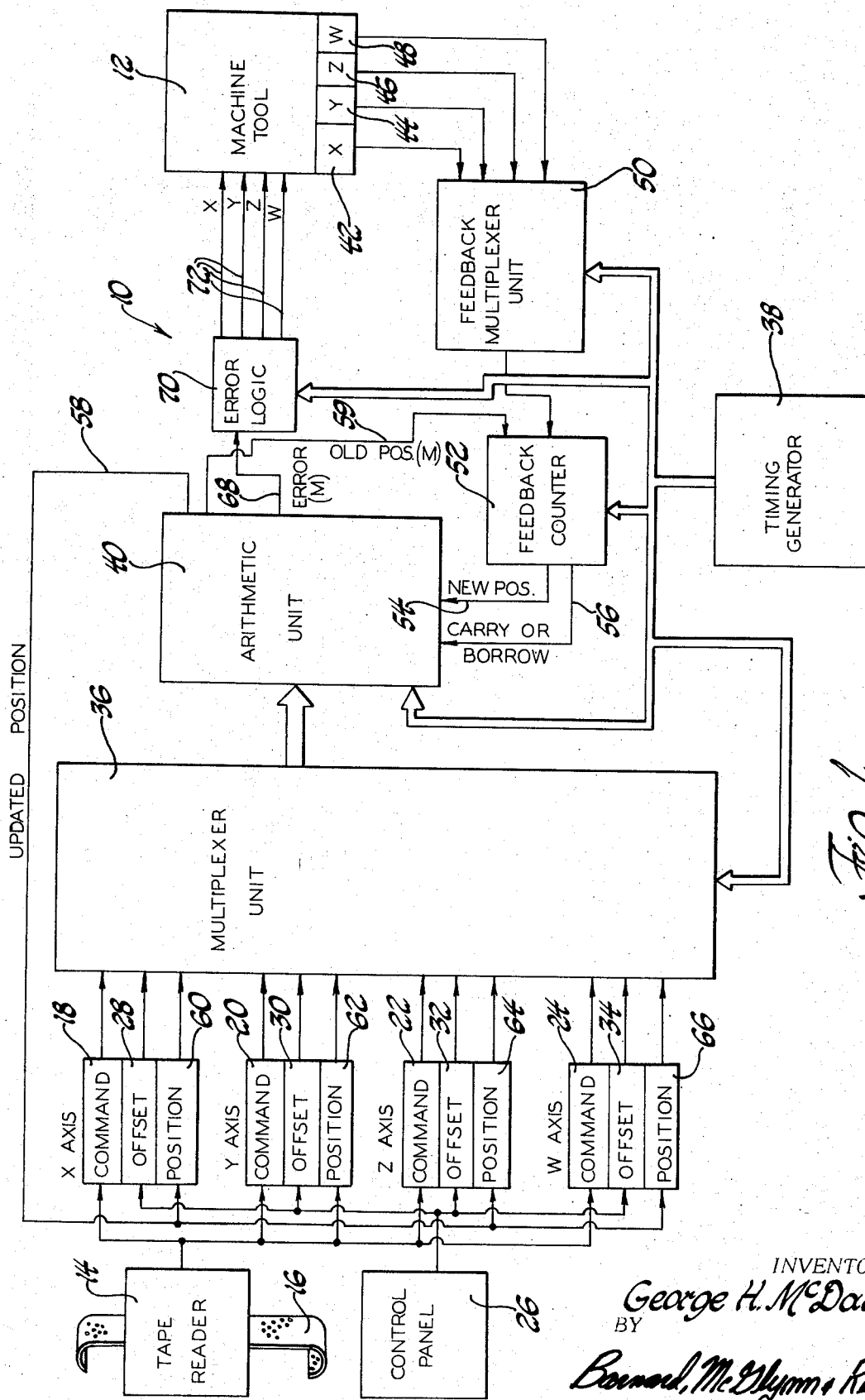
FIG. 1 is a block diagram of a numerical control system employing the invention.

Referring now to FIG. 1, there is shown a numerical control system 10 for positioning the various tool slides of a four-axis machine tool 12 according to position commands which are entered into the system 10 by means of a tape reader 14. The tape reader 14 is an electro-optical device adapted to read a part program tape 16 having a plurality of parallel channels the information in those channels being represented in a BCD code by means of the presence or absence of punched holes in the tape 16. The position commands which are read by the tape reader 14 from tape 16 for the four-controlled axes, herein identified as X, Y, Z, and w, are directed to 32-bit command storage registers 18, 20, 22, and 24, respectively. Tool offsets along the various axes are entered by way of a control panel 26 into 32-bit offset storage registers 28, 30, 32, and 34. The command-position signals and the offset signals are sequentially scanned by means of a four-channel multiplexer unit 36 operating under the control of a timing generator 38. Unit 36 is more fully described in U.S. Pat. No. 3,666,930 filed in the name of George H. McDaniel. The time-multiplexed command and offset signals are applied by the multiplexer 36 to an arithmetic unit 40, one of the functions of which is to derive an error signal for application to the machine tool 12 which is proportional to the position-command signal plus the offset signal minus an actual position signal for each axis. Another function of the arithmetic unit is to compare the error signals to predetermined trip points and to control movement of the tool slides accordingly. This is also set forth in the above U.S. Pat. No. 3666930.

The actual position signal is obtained for the X, Y, Z, and w axes by way of feedback transducers 42, 44, 46, and 48, respectively. These feedback transducers are devices of the type which produce a substantially sinusoidal output waveform which varies in phase according to the mechanical position of a tool slide or such other movable element with which such devices are commonly connected. Resolvers and Inductosyn devices are suitable for this use as is well known in the art. The variable phase position feedback signals are applied to a feedback multiplexer unit 50 which is like unit 36, but smaller, and which operates under the control of the timing generator 38. Unit 50 operates to convert the sinusoidal waveforms from the feedback transducers to squarewaves of phases which correspond to the phases of the sine waves and to sequentially scan for multiplexing purposes the variable phase squarewaves for sequential or time-division multiplexed application to a feedback counter 52.

The feedback counter 52 operates to measure the phase of each time-division multiplexed portion of the feedback signal from multiplexer unit 50 and to apply a three-digit multiplexed "new position" signal to the arithmetic unit 40 by way of line 54. The feedback counter 52 also operates to compare the digital count representing the measured phase with a previously measured digital position quantity to determine whether a "carry" or a "borrow" should be applied to the arithmetic unit 40 by way of output line 56 to formulate the next most significant digit in the new digital position quantity being prepared. To clarify this point, it should be observed that to obtain high position resolution, the variable phase signals which emerge from the position feedback transducers 42, 44, 46 and 48 exhibit a plurality of full, 360° phase changes over the total range of tool slide displacement. Thus, raw phase information cannot, without further operations, indicate absolute mechanical position over the entire position range. Accordingly, it is necessary to indicate not only relative phase information by way of a three-number digital count but also to indicate the positive or negative going characteristics of the phase change. In the present example, the sign of the position range must also be indicated. In accordance with the illustrative embodiment, this is accomplished by indicating phase as a digital quantity, the least significant digits of which are derived from the actual phase measurement process and the more significant digits of which are derived from a comparison of measured phase to last-measured phase.

The multiplexed and completed position feedback signal from the arithmetic unit 40, containing all digits as well as sign information, is applied by way of output line 58 to the 32-bit feedback position storage registers 60, 62, 64, and 66 corresponding to the X, Y, Z, and w axes, respectively. The storage registers 18, 28, 60, 20, 30, 62, 22, 32, 64, and 24, 34, 66 thus contain all of the information necessary to derive the position-error signal in the arithmetic unit 40 and to produce a multiplexed position error signal on output line 68. This position-error signal on line 68 is applied to an error logic unit 70 which operates on the control of the timing generator 38 to distribute the output signals for the X, Y, Z, and w axes to the various devices of the machine tool 12 by way of output lines 72. Those skilled in the art will recognize unit 70 as a simple demultiplexer.

Figure 2:
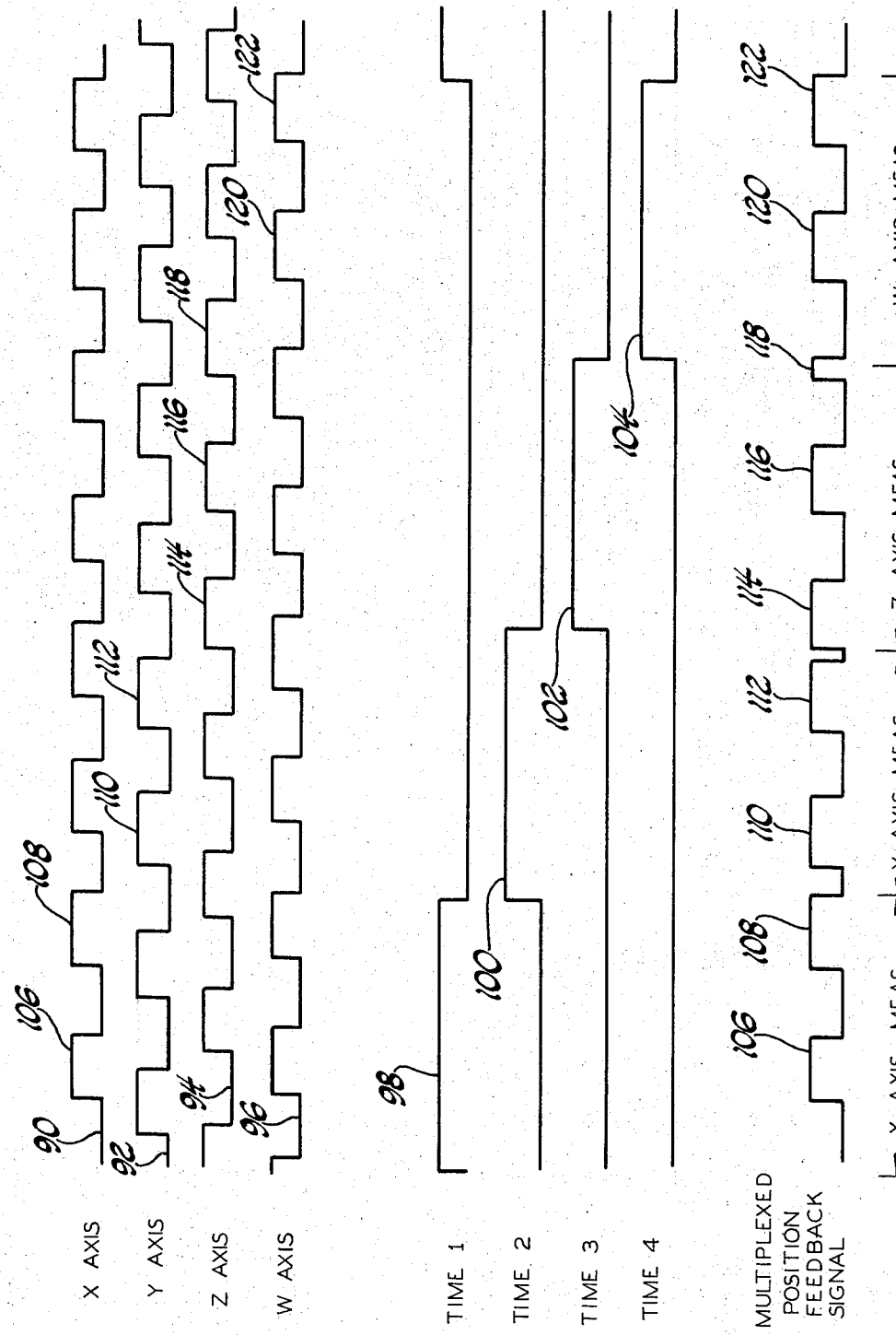
FIG. 2 is a waveform diagram indicating the illustrated multiplexing scheme.

Referring now to the waveform diagram of FIG. 2, the operation of the feedback multiplexer unit 50 will be described in further detail. In FIG. 2 squarewave forms 90, 92, 94, and 96 represent the squarewave counterparts of the sinusoidal position feedback signals which emerge from the position feedback transducers 42, 44, 46, and 48, respectively. These waveforms are generated by applying the sinusoidal waveforms to zero crossing detectors in the multiplexer unit 50 and by employing the outputs of the zero crossing detectors to toggle bistable multivibrators or flip-flops. This type of circuitry is notoriously old and well known in the art and, thus, is not described in specific detail.

The timing signals which are produced by the timing generator 38 are shown in FIG. 2 as Time 1, Time 2, Time 3, and Time 4 waveforms having respective time-staggered pulses 98, 100, 102, and 104, respectively. The timing signals are applied to the inputs of coincidence-type AND gates, best shown in FIG. 3, to sequentially gate the position feedback signals of waveforms 90, 92, 94, and 96 onto a single line in a time-division multiplexed fashion.

The lower line of FIG. 2, labeled "multiplexed position feedback signal," illustrates the waveform which appears on the single output line as a result of the time-staggered gating of the squared position feedback signals. During the pulse 98 of Time 1, square pulses 106 and 108 of the position-feedback signal are gated onto the single output line. X axis pulse 100 of Time 2, the square pulses 110 and 112 of the Y axis position feedback signal are gated onto the single output line. During the pulse 102 of Time 3, the squarewave pulses 114, 116, and a portion of pulse 118 are gated onto the output line from the Z axis position feedback signal. Finally, during the pulse 104 of Time 4, squarewave pulses 120 and 122 of the w axis position feedback signal are gated onto the output line.

Figure 3:
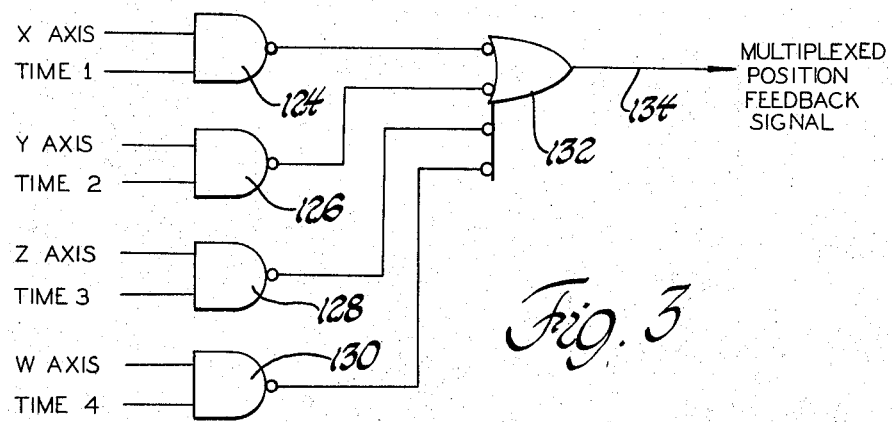
FIG. 3 is a schematic diagram of a typical multiplexer logic circuit.

FIG. 3 is a circuit diagram of a representative gating arrangement for accomplishing the multiplexing function graphically set forth in FIG. 2.

FIG. 3 comprises AND gates 124, 126, 128, and 130 connected to receive the squarewave counterparts 90, 92, 94, and 96, respectively of the X, Y, Z, and w position feedback signals. In addition, the AND gates 124, 126, 128, and 130 are connected to receive the Time 1, Time 2, Time 3, and Time 4 FIG. 2 which are generated by the timing generator 38. Accordingly, gate 124 is conductive during the pulse 98, gate 126 is conductive during the interval of pulse 100, gate 128 is conductive during the interval of pulse 102, and gate 130 is conductive during the interval of pulse 104. The outputs of the AND gates are connected commonly to an OR gate 132 having an output line 134. The OR gate is rendered conductive by any signal input from the group of AND gates and, thus, the multiplexed position feedback signal (MPFS) of FIG. 2 appears on line 134 within the multiplexer unit 50.

Figure 4:
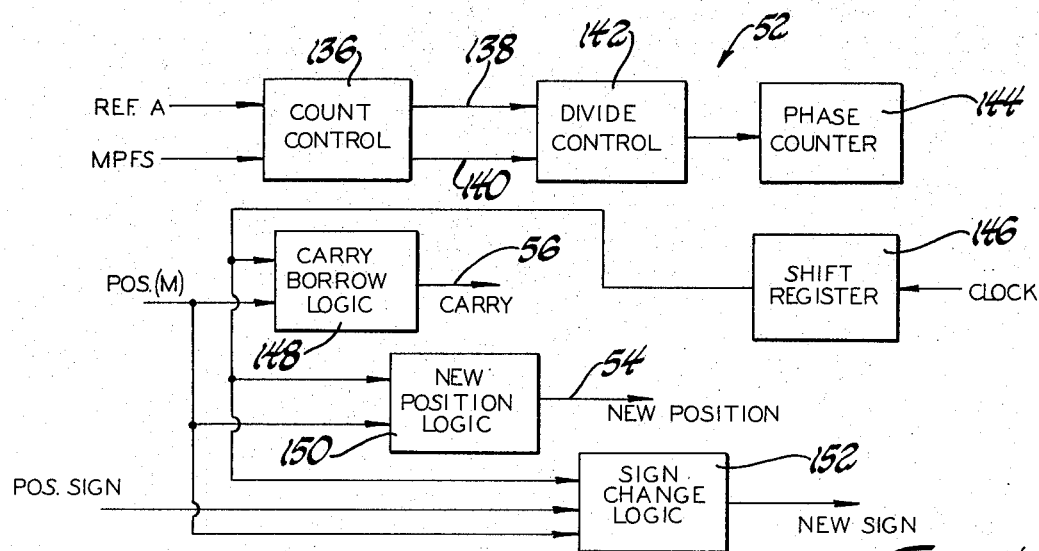
FIG. 4 is a more detailed block diagram of the feedback counter block of FIG. 1.

FIG. 4 discloses is a block diagram the internal divisions of the feedback counter 52 of FIG. 1. The feedback counter 52 comprises a count control unit 136 having inputs corresponding to a phase reference signal referred to in FIGS. 5 through 8 and the multiplexed position feedback signal (MPFS) on the bottom line of FIG. 2. The count control unit 136 has outputs 138 and 140 representing pulse trains occurring at different frequencies, the pulse train on line 138 occurring at twice the frequency of that on line 140. The control unit 136 is responsive to the particular combination of input signals to select one or the other of two lines for operation. The outputs 138 and 140 are connected to a divide control unit 142 for averaging purposes. The output of control unit 142 is connected to a phase counter 144 which is a parallel input register. The output of phase counter 144 is connected for parallel data transfer to a shift register 146 having a clock input to convert the digital information applied thereto to serial form. The output of shift register 146 is connected commonly to a carry-borrow logic unit 148, a new position logic unit 150, and a sign change logic unit 152.

The shift register 146 produces a three-digit output corresponding to the three least significant digits of the current phase count for each of the control axes. The multiplexed old position signal which is retrieved by arithmetic unit 140 is also applied by way of line 59, from position stores 60, 62, 64, and 66, commonly to the inputs of the units 148, 150, and 152. A third input corresponding to the position sign is applied to sign change logic unit 152.

The carry-borrow logic unit 148 determines whether the next most significant feedback count digits to the three digits produced by the shift register 146 should be affected by a "carry" indicating a completed phase change cycle in the positive direction or a "borrow" indicating a completed phase change cycle in the negative direction. This signal appears on output line 56 as previously described with reference to FIG. 1. The new position logic 152 makes the comparison (addition) between the current feedback count and the last feedback count to determine the total actual position of the tool slide along the designated axis. This output signal appears on line 54. The sign change logic unit 152 operates on the three input signals thereto to indicate that the phase measurement is either in the positive or negative range relative to a ZERO phase reference position more fully described with reference to FIGS. 5 through 8. This signal appears on an output line 57.

Figure 5:
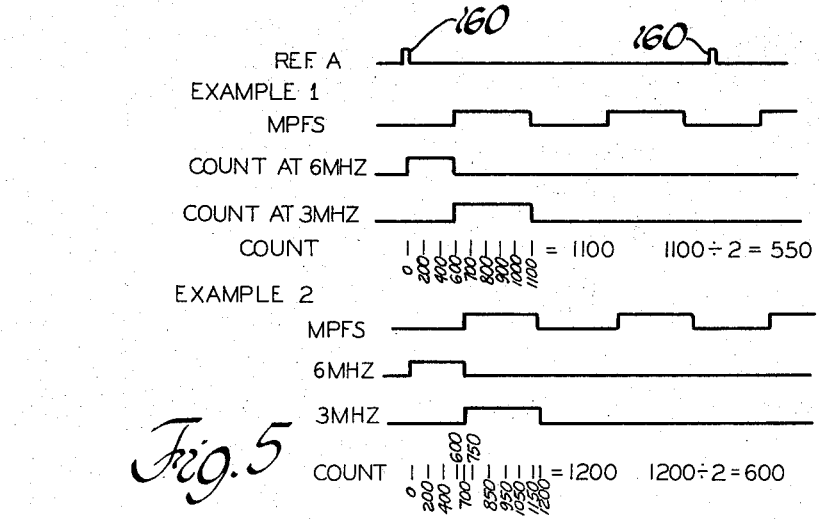
FIG. 5 is a waveform diagram of first and second examples of counting.

Referring now to FIG. 5, examples of two actual phase counts and the indication of the difference between these counts will be described. The reference signal which is applied to the count control unit 136 of FIG. 4 is shown to comprise a series of pulses 160 which are spaced far (2 cycles) apart relative to the essential rate of variation in the multiplexed position feedback signal (MPFS). The count control unit 136 is set up such that with MPFS in the low-voltage condition upon the occurrence of reference A as shown in example one of FIG. 5, output line 138 is activated to supply pulses to the divide control register unit 142 at a rate of 6,000 cycles per second (6 MHZ). This count prevails during the interval 162 between the occurrence of the reference pulse 160 and the rise time of the MPFS position feedback pulse. During the time the MPFS is in the high-voltage state, output line 140 of count control unit 136 is energized to count at three-thousand cycles per second (3 MHZ). This count terminates at the trailing edge of the MPFS pulse. In example one, the total count is 1,100 pulses. Divide control unit 142 divides this pulse count in half to produce an average of 550 pulses. This is applied to the phase counter 144 in parallel form and to the shift register 146 for conversion to serial form.

In example two, the MPFS signal is again in the low-voltage condition upon the occurrence of reference pulse 160 and so during the interval of 166 pulses are applied to the divide control register unit 142 at 6 MHZ. Again, during the interval of pulse 168, pulses are applied to the divide control unit 142 by way of line 140 at 3 MHZ. A total count of 12,000 pulses is achieved and when divided by two for averaging purposes a total count of 600 pulses is realized. The difference in count between examples one and two is 50 counts indicating a phase difference of 50 counts. At 1,000 counts per phase monitoring transducer cycle this represents one-twentieth of a cycle and since the phase signal transducers are mechanical devices, fractions of cycles can be expressed in terms of inches of tool slide displacement. The 550 and 600 pulse counts from examples one and two are applied to the new position logic unit 150 to add the difference to the previous pulse count and produce new position signals which are applied to the arithmetic unit 40 for calculation of the error signals. The pulse count is also applied to the carry-borrow logic unit 148 for comparison to the previous position signal to determine whether a full cycle has been completed in either the positive or negative direction thereby to determine whether either a carry or a borrow, respectively, is necessary.

Figure 6:
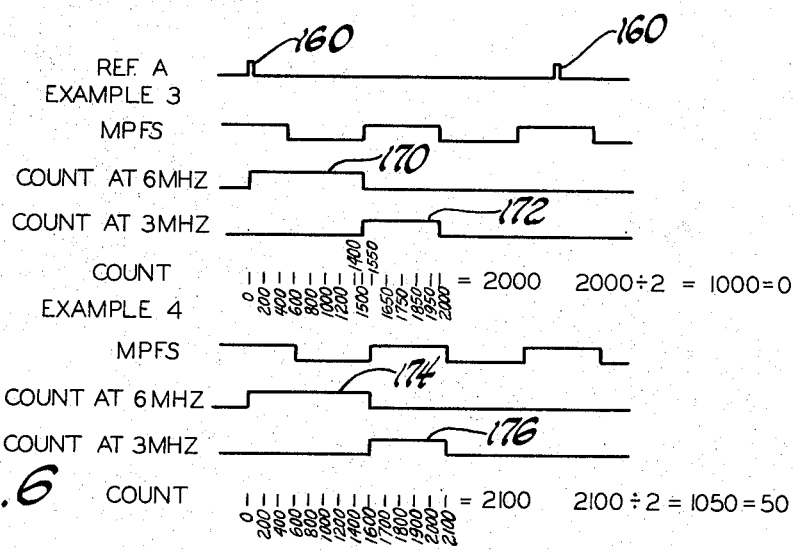
FIG. 6 is a waveform diagram of third and fourth examples of counting.

Referring to FIG. 6, two further examples of phase counts are shown. Again, the reference signal comprises pulses 160. However, in example three the MPSF signal is in the high-voltage condition when the reference pulse 160 occurs. Accordingly, during an interval 170 between the occurrence of the reference pulse 160 and the next rise time of the MPFS signal pulses are supplied to the divide control unit 142 at a rate of 6,000 cycles per second. During an interval 172 between the rise time of MPFS and the next fall time of MPFF pulses are counted at the rate of 3,000 cycles per second. A total count of two-thousand pulses is realized and when divided in unit 142, a total count of 1,000 pulses is transferred to the phase counter 144. The most significant digit is ignored giving an effective ZERO count which indicates a ZERO phase position of the transducer giving rise to this count.

In example four, the MPFS signal is again high upon the occurrence of reference pulse 160. Accordingly, pulses are counted at 6,000 cycles per second during an interval 174 between reference pulse 160 and the next rise time of MPFS. During the interval 176 between the rise time of MPFS and the next fall time of MPFS, pulses are again counted at the 3,000 cycle per second rate. A total count of 2,100 pulses is realized and when divided by two in the divider control unit 142, an effective count of 1,050 pulses is produced. Again, the most significant digit is ignored giving rise to an effective pulse count of 50. Again, the 50-pulse count difference between examples three and four is indicated as one-twentieth of a cycle of transducer displacement and this figure is translatable into physical displacement terms as previously described.

Figure 7:
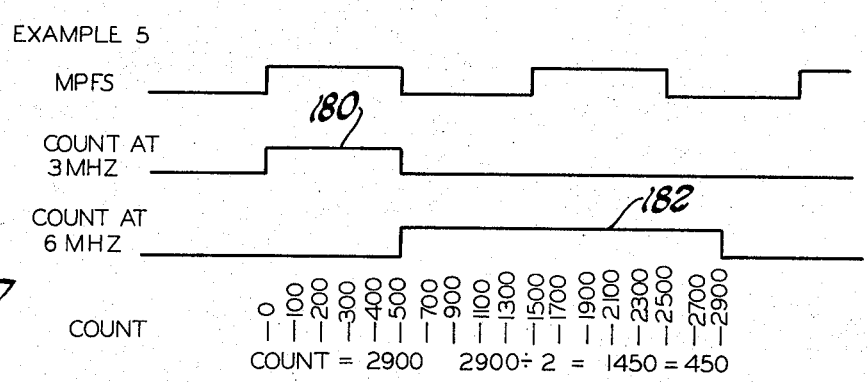
FIG. 7 is a waveform diagram of a fifth example of counting.

Referring now to FIG. 7, an example of operation of the digital pulse count for phase-measurement purposes is given with respect to a negative axial slide position rather than positive as was the case in the examples of FIG. 5 and 6. In this regard, it should again be observed that a full cycle of position feedback transducer operation occurs for each increment of slide displacement over a much larger range of possible slide displacement. Accordingly, it might be said that the position feedback signal from each axis goes through a "-zero phase" many times over the total range of possible displacement, and any one of these zero phase positions can be selected as a zero reference position. In actual operation the attendant operator sets the machine tool slide in a zero or close to a zero position and zeros the position store registers 60, 62, 64, and 66 of FIG. 1 by means of a clear control, not shown, and assumes a zero reference position from the zero-phase point closest to that point. Slide displacement to the left of that point, for example, may be thereafter defined as negative displacement and slide displacement to the right of that point, for example, may thereafter be designated a positive axial displacement. The same basic approach is followed for each controlled axis until a zero reference position has been selected for each axis. In this respect, it will further be observed that the zero reference position may be selected totally to one side or the other of the range of displacement such that displacement of only one sign is possible. However, the benefits to be derived from the present invention contemplate the selection of a midrange zero reference position from which both positive and negative tool displacement is possible.

In FIG. 7 the multiplexed position feedback signal MPFS is low at the occurrence of reference pulse 160 but unlike the example of FIG. 5, counting does not occur until the leading edge of the first MPFS pulse. This count begins at 3,000 cycles per second and continues over a duration of pulse 180, that is, until the trailing edge of the MPFS signal. AT this point, the count is continued at the 6 megacycle as indicated by pulse 182. At the end of pulse 182 the count is terminated and a total count of 2900 pulses is registered. When divided by 2 and after subtracting the most significant digit, a pulse count of 450 is realized. Again, this pulse count is sent along with carry or borrow information to the arithmetic unit 40 of FIG. 1 and an updated position signal is transferred by way of line 58 to the position store register 60, 62, 64, and 66.

Figure 8:
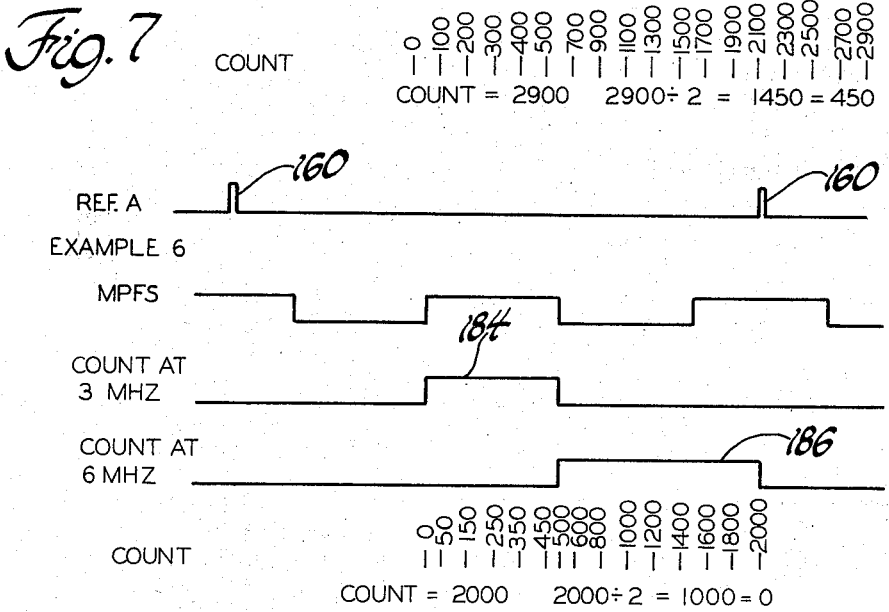
FIG. 8 is a waveform diagram of a sixth example of counting.

Referring now to the example of FIG. 8, the multiplexed position feedback signal MPFS is high upon the occurrence of reference pulse 160 and again the axis position is negative so the accumulation of pulses at the 3,000 cycle per second rate does not begin until the rise time of MPFS occurring after the pulse 160. pulses are accumulated at this rate during the pulse time 184 and thereafter at 6,000 cycles per second during the pulse time 186 between the trailing edge of pulse 184 and the next reference pulse 160. A total count of 2,000 is indicated and dividing by 2 and ignoring the most significant digit a zero count is indicated which, of course, corresponds to a zero phase position.

Summarizing the foregoing examples of operation, the rules followed by the feedback counter 52 and particularly by the count control unit 136 thereof are as follows:

1. For positive axial positions if MPFS is low at the reference pulse, the count begins at the reference pulse at 6 MHZ and continues until MPFS goes high. While MPFS is high, the count continues at 3 MHZ.

2. For positive axial positions if MPFS is high at the reference pulse, the count begins at the reference pulse at 6 MHZ and continues until MPFS goes low and then high. At this point the count continues at 3 MHZ while MPFS is high.

3. For negative axial positions if MPFS is low at the reference signal when MPFS goes high, the count starts at 3 MHZ. When MPFS goes low, the count continues at 6 MHZ until reference pulse occurs again.

4. For negative axial positions if MPFS is high at the reference signal, wait until MPFS goes low then high then begin counting at 3 MHZ while MPFS is high. When MPFS goes low, count at 6 MHZ until the reference signal occurs again.

It will be noted in the examples that overflows of the phase counter 144 which would represent the most significant digit are ignored. Instead, a carry or borrow signal is generated depending upon the direction of phase change, i.e., either increasing or decreasing. This signal is generated by the carry-borrow logic unit 148 and determines the most significant digit to be applied to the actual phase measurement count signal which is produced by the phase counter 144. As indicated in FIG. 1, the carry or borrow signal is added in with the new position phase count on line 54 in the arithmetic unit 40 and the position update signal representing the total new position signal including the sign information is fed back to the position store register 60, 62, 64, and 66.

In a practical example, the position store register 60, 62, 64, and 66 are each of 32 bits in length, thus, to represent 28 numerical bits, one sign bit, and three unused bit positions which are constantly maintained in a zero state. Each digit position of the slide position expressed in inches is represented by four bit positions in the position store registers and, thus, seven numerical digits in inches of slide position are represented in the position information in the system of FIG. 1. The three least significant digits are represented by the feedback transducer signals, the next most significant digit being determined by the total accumulated position storage indication taking into account the last generated carry or borrow signal. In other words, the three least significant digits are generated freshly upon each cycle of transducer operation but the total position signal stored in the register 60, 62, 64, and 66 is an accumulated position count. To obtain this mode of operation it is, of course, necessary to correlate the position feedback cycles to the tool slide displacement and the sample times of the feedback counter to the maximum slide traverse rate. In the present example described herein, the correlation is such that no more than the four least significant digits of the position indication may change during any one sample time. Therefore, the reference pulses 160 are generated at a rate of once every two cycles of position-feedback transducer operation.

Referring again briefly to FIG. 4, the operation of the carry-borrow logic unit 148 is such that if the three least significant digits of the old position signal are 800 or more and the new position signal is less than 100, the apparatus assumes the slide position has progressed in the increasing direction through a transducer zero phase position. Thus, it is necessary to generate a carry which determines the next most significant digit. On the other hand, if the old position number is 100 or less, and the new position number is 800 or more, the apparatus assumes that the tool slide position has progressed through a transducer zero phase position in the decreasing direction. Therefore, a borrow signal is generated to determine the next most significant digit. As will be apparent to those of ordinary skill in the art, a borrow signal can be generated by a BCD addition of 15 (1111 in BCD) to the existing number, disregarding the carries, if any. For operation in the negative range a mirror image treatment of numerical factors is obtained by complementing those number as necessary.

Figure 9A:
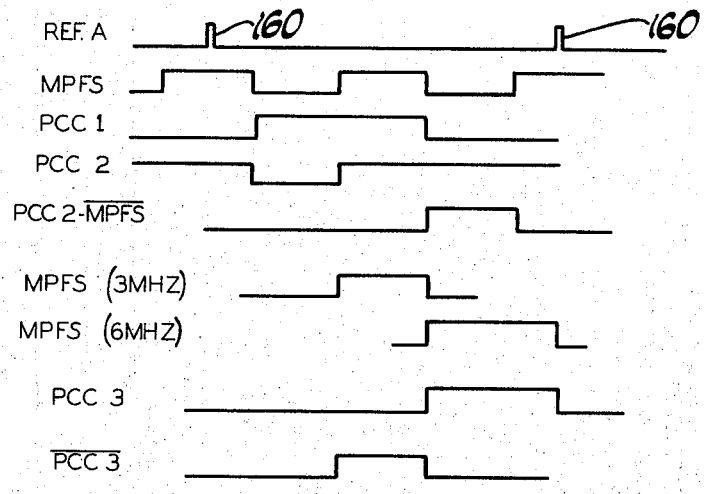

Referring now to FIG. 9 and the waveform diagrams of 9a, the count control unit 136 of FIG. 4 is shown in schematic circuit detail. This unit comprises a plurality of conventional logic units including clocked flip-flops 200, 202, 204, and 206 which are clocked at a 6 MHZ rate to provide the signal responses according to the signal condition rules previously set forth herein. The multiplexed position feedback signal MPFS and the zero phased reference pulses 160 are applied to the flip-flop 200 (PCC1) through conventional logic units including the inverter 208 and the AND gate 210. The inverse of the MPFS signal is also applied to the reset input of flip-flop 200 through the indicated logic units. Accordingly, the output signal on the ONE output of flip-flop 200 follows the signal sequence indicated on the third line of FIG. 9a. Flip-flop 202 (PCC2) is connected to receive certain outputs from flip-flop 200 along with other inputs so as to produce the signal waveform shown on the fourth line of FIG. 9a. The object of the circuit of FIG. 9 is to control the output of the nand gate 212 so as to count according to the positive and negative axial position rules hereinbefore set forth. Accordingly, both information regarding the state of MPFS relative to the reference pulses 160 and the sign of the position feedback signal must be taken into account. The sign information is derived from a multiplexer 214 which multiplexes position sign information from the position store register 60, 62, 64, and 66 appearing on the input lines designated PSX, PSY, PSZ and PSw, respectively. These position sign signals are multiplexed onto line 216 which is high for a negative sign position and onto line 218 which is high for a positive sign condition, that is, when the axial position is positive relative to the arbitrarily zero reference position. The sign information is applied to the gates 220 along with signals from the flip-flops 200 and 202 such that flip-flop 204 is set whenever a 6 MHZ count is to be produced and reset whenever a 3 MHZ count is to be produced. The count whether zero, 6 MHZ, or 3 MHZ is applied to the flip-flop 206 (PCC 4) to divide the total count by 2. Accordingly, the output on line 22 is either zero, 3 MHZ, or 1.5 MHZ in accordance with the rules previously set forth.

Figure 10:
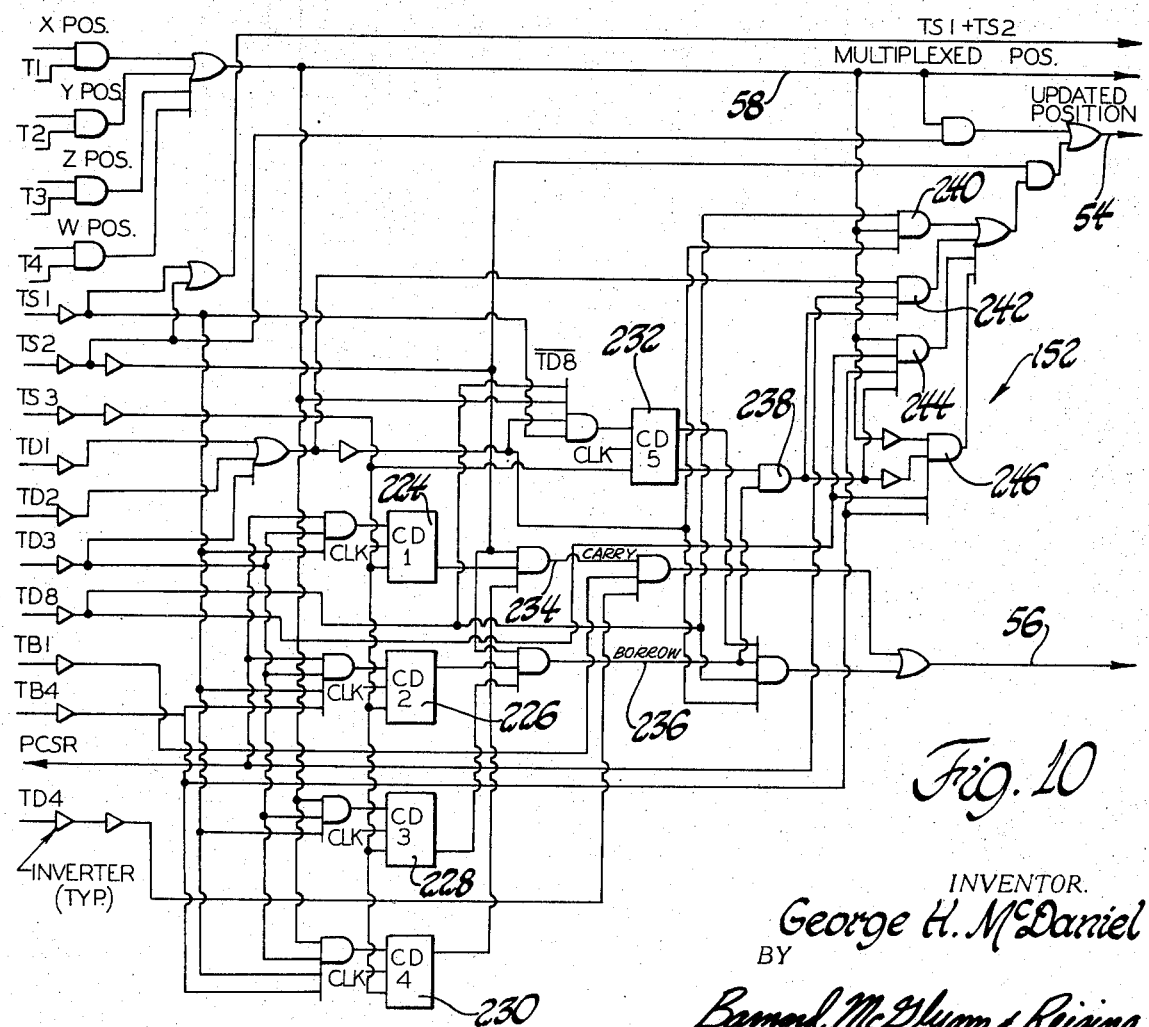

FIG. 10 is a schematic circuit diagram with signal indications given thereon for the carry-borrow logic unit 148, the sign change logic unit 152, and the new position logic unit 150 of FIG. 4. The carry-borrow logic 148 comprises clocked flip-flops 224, 226, 228, 230, and 232 also designated CD1, CD2, CD3, CD4, and CD5, respectively. The signals which are applied to the circuitry of FIG. 10 include the timing signals TA1, TA2, TA3, and TA4 for all of the multiplexer units, sequence times TS1, TS2, TS3, during which the various arithmetic operations performed by the arithmetic unit 40 are performed; for example, during TS1, the new position count is compared with the count from the position storage registers, during TS2 the new position information is transferred to the storage registers; TD1, TD2, TD3, and TD8 are digit times during which position digits are read and TB1 and TB4 are bit times within a particular digit, it being previously indicated that each digit has four bits.

The flip-flop 224 (CD1) is set when the phase-counter shift register signal is 100 or greater, this information being observed by monitoring the third digit time as indicated; the first digit time expresses the shift register count in units, the second digit time expresses the shift register count in tens, and the third digit time expresses the shift register count in hundreds. The flip-flop 226 (CD2) is set when the phase count shift register contents are 800 or greater, this being observed by monitoring the third digit time and the fourth bit time in that digit time; the first bit time in the third digit time being the 100 number, the second bit time being the 200 number, the third bit time being the 400 number, and the fourth bit time being the 800 number. The flip-flop 228 (CD3) is set when the multiplexed position store signal is 100 or greater and the flip-flop 230, (CD4) is set whenever the multiplexed position store signal is 800 or greater. The flip-flop 232 (CD5) is set for zero of all digits of the multiplexed position store signal. Accordingly, all of the information necessary to carry out the carry and borrow logic determinations is made available by the flip-flops 224, 226, 228, 230, and 232 together with the associated conventional logic units indicated. It will be noted that the inverse of TD8 is applied to several of the logic units to nullify any sign bit which might be present since sign information is not pertinent at that point.

The end result of the carry-borrow logic is to produce a carry signal on line 234 whenever the third most significant digit (corresponding to TD4) is to be increased by one and a borrow signal on line 236 whenever the fourth most significant digit is to be decreased by one. As previously described, the carry signal generated whenever the new phase position count indicates that a zero phase reference has been passed in the increasing phase direction and a borrow signal has been generated whenever a zero phase position has been passed in the decreasing direction.

The reset output of flip-flop 232 along with the borrow signal on line 236 is applied to the nand gate 238 which forms part of the sign change logic unit 152. This logic unit further includes nand gate 240 which indicates the old, most significant four digits, NAND gate 242 which indicates the new, least significant three digits, NAND gate 244 which indicates a sign change from negative to positive and NAND gate 246 which indicates a sign change from positive to negative. Again, a sign change is indicated by monitoring the fourth and higher most significant digits and determining whether a zero reference passage corresponds to the reduction of the fourth and higher, most significant digits to zero since it was previously established that the zero absolute phase reference was manually set by zeroing the position store registers at an arbitrarily selected zero position transducer phase position.

The output of the circuitry of FIG. 10 includes line 54 which carries the new position information and line 58 which carries the multiplexed current position information from the position store registers. The outputs further include line 56 which indicates the carry and borrow conditions as previously described.

In summary, it has been shown herein that a phase measuring position feedback system for a numerically controlled machine can be established to provide a digital position indication in the form of a count wherein the cycles of the position feedback transducers are relatively short such that many such cycles can occur during the complete traverse of a machine element, such as a tool slide. Position information is derived from the count by means of logic which determines whether the controlled element is in an arbitrarily established positive displacement range or a negative displacement range for counting at multiple rates according to predetermined rules. Moreover, the counting system is established such that the position feedback transducers provide the least significant digits of the feedback count and the next most significant digit is determined by logic which follows mathematical rules for deteriming the necessity of generating carry and borrow signals according to whether an intermediate zero phase position has been passed. In the example given herein, limits of 100 and 800 are arbitrarily selected for determining the zero phase excursion probabilities although it is to be understood that other numerical designators with other limits can, of course, be selected. It has also been shown that the logical manipulations including the measurement of the position feedback signals, the generation of new position signals, and the transfer of such signals to and from position storage registers can be accomplished in a multiaxial device in a time-division, multiplexed fashion. It is to be understood that the foregoing description is illustrative in character and is not to be construed in a limiting sense.

The embodiments of the invention in which an exclusive property or privilege is claimed are defined as follows:

1. A numerical control system comprising: first means for developing an alternating signal which cyclically varies in phase according to the displacement of a movable machine element; second means for determining the phase difference between said signal and a periodically occurring reference signal and generating a digital count representing said phase difference; position storage means for containing a digital position quantity; and third means for calculating from the digital count and the digital position quantity a new digital position quantity indicating both the direction and total displacement of said element relative to an arbitrarily selected zero reference point, said first means additionally comprising means responsive to a sinusoidal waveform for developing a square waveform of a phase corresponding to that of the sinusoidal waveform.

2. A system as defined in claim 1 wherein said second means comprises count control means receiving said alternating signal and said reference signal and responsive to a coincidence thereof to count at a predetermined rate only when the machine element is in a positive range relative to the zero reference point.

3. A system as defined in claim 1 wherein said second means includes means for deferring a count until the first full cycle of said alternating signal whenever the machine element is in a negative range relative to the zero reference point.

4. A system as defined in claim 1 wherein the third means comprises a counter for containing said digital count, a shift register for receiving said count from said counter in parallel, the shift register being connected to transfer said count serially to said position storage means.

5. A system as defined in claim 1 wherein said digital count includes a plurality of lesser significant digits, said third means including logic for producing a carry signal to the next most significant digit in said digital position quantity whenever the digital count is less than the digital position quantity by a predetermined amount thus indicating a cycle completion in said alternating signal in a phase-increasing direction.

6. A system as defined in claim 5 wherein the third means includes logic for producing a borrow signal from the next most significant digit in said digital position quantity whenever the digital count exceeds the digital position quantity by a predetermine amount thus indicating a cycle completion in said alternating signal in a phase-decreasing direction.

7. A system as defined in claim 1 including a plurality of said first means for producing respective alternating signals representing displacement of said element in respective directions; a plurality of said position storage means for digital position quantities associated with respective directions; and multiplexer means for applying the alternating signals and the counts derived therefrom to the second and third means in a time-staggered sequence.

8. A numerical control system for a machine having an element movable controllably along each of several axes comprising: means for providing position command signals for the respective devices; means for providing position feedback signals from each of said devices; an arithmetic unit for producing position error signals for each of said devices as a function of the difference between the position command signals and the position feedback signals; and multiplexer means for applying the position feedback signals to the arithmetic unit in a time-divided sequence.

9. A numerical control system as defined in claim 8 wherein the multiplexer means includes means responsive to substantially sinusoidal position feedback signals for generating respective square waveforms of a phase corresponding to the phase of the sinusoidal signals, said system further including means for generating a phase reference signal, and feedback counter means for determining the phase difference between the square waveforms and the reference signal and providing a digital representation thereof to the arithmetic unit.

10. A numerical control system as defined in claim 9 wherein the feedback conter includes means for indicating whether the position feedback signal for each cycle of the measurement sequence is greater or less than the signal for the succeeding cycle.

11. A numerical control system as defined in claim 9 wherein the feedback counter includes means for generating a count having no more than a predetermined number of digits, means for generating a carry signal to the next most significant digit for increasing feedback position changes, means for generating a borrow signal to the next most significant digit for decreasing feedback position changes, and means responsive to at least the next most significant digit to determine when the count passes through an arbitrarily selected absolute zero position.

* * * * *